Figures 1, 2:
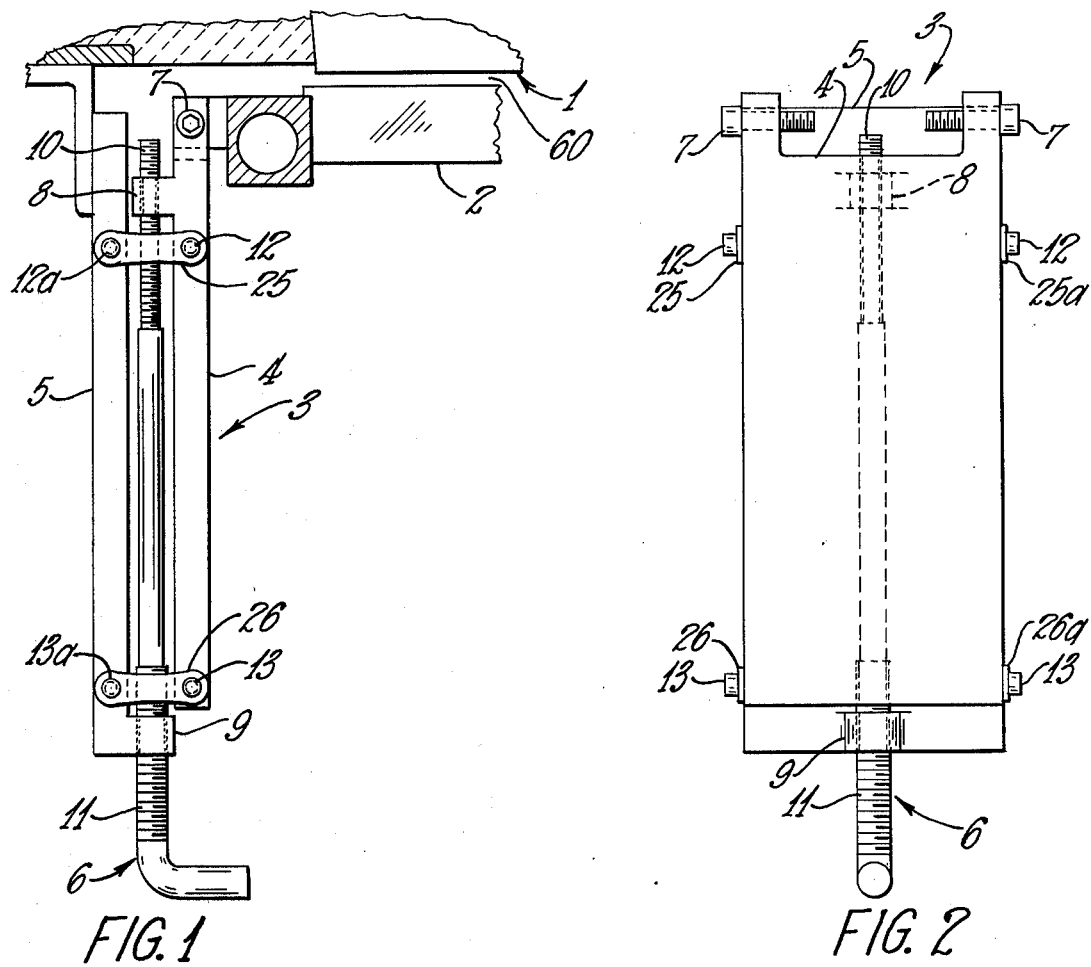

United States Patent [19]

Symborski

[11] 4,082,469

[45] Apr. 4, 1978

[54] ADJUSTMENT MECHANISM

[75] Inventor: Alex P. Symborski, Newark, Ohio

[73] Assignee: Owens-Corning Fiberglas Corporation, Toledo, Ohio

[21] Appl. No.: 761,744

[22] Filed: Jan. 24, 1977

[51] Int. Cl.² ............................................. F16B 7/06
[52] U.S. Cl. ....................................... 403/24; 403/47
[58] Field of Search ..................... 403/43, 44, 45, 46, 403/47, 48, 24

[56] References Cited

U.S. PATENT DOCUMENTS

| 1,118,915 | 12/1914 | Broluska | 403/46 |
| 2,446,624 | 8/1948 | Allison | 403/48 X |
| 2,531,308 | 11/1950 | Thomas | 403/43 X |
| 3,841,774 | 10/1974 | Maxey | 403/47 X |

Primary Examiner—Andrew V. Kundrat
Attorney, Agent, or Firm—Ronald C. Hudgens; Philip R. Cloutier; Kenneth H. Wetmore

[57] ABSTRACT

An adjustment mechanism is provided, the mechanism providing minute movement by use of a single screw engaging a fixed member and a movable member. The mechanism is particularly suitable for finshield adjustments adjacent bushings.

10 Claims, 2 Drawing Figures

U.S. Patent     April 4, 1978     4,082,469

ADJUSTMENT MECHANISM

This invention relates to adjustment mechanisms.

In one of its more specific aspects, this invention provides apparatus which enables minute repositioning by use of a bi-sectionally threaded screw.

Need for mechanisms which enable minute repositioning of pieces of apparatus relative to each other is well known. One particularly important need for such a mechanism is in the glass fiber production industry wherein minute repositioning of finshield cooling devices relative to the bushing from which the fibers are drawn is of extreme importance. Frequently, it has been found that attempts at a repositioning of the finshield relative to the bushing cannot be accomplished in sufficiently small increments. Relatedly, it has been found that frequently once repositioning has been accomplished, the relative position of the finshield and bushing is gradually altered by vibratory effects. The apparatus of this invention solves these problems.

According to this invention, there is provided an adjustment mechanism which comprises first and second members, one of which is fixed and one of which is movable, both members being engaged by a bi-sectionally threaded screw, the threads of the sections having unlike pitches.

While the apparatus of this invention is suitable for the relative positioning of any two bodies, it is particularly suitable for making adjustments between bushings and finshields but is not limited thereto.

The apparatus of this invention will be more easily understood if explained in conjunction with the drawings in which:

FIG. 1 depicts a side view in elevation of the apparatus of this invention; and, FIG. 2 depicts a front view in elevation of this invention.

Referring now to FIGS. 1 and 2, there are shown object 1 and object 2, in this instance, a bushing and finshield, respectively, it being desired to alter the distance 60 therebetween by means of adjustment mechanism 3.

Adjustment mechanism 3 is comprised of three principal parts, first riser plate-like member 4, second plate-like member 5 and screw 6 positioned therebetween.

First riser member 4 is adapted at its upper end with suitable connection means for attaching to the object to be moved, for example, by means of connection 7. The first member, preferably, has an outwardly projecting, threaded section 8. The first member is bored in its upper section for the insertion of bolt 12 and is bored in its lower section for the insertion of bolt 13.

Second member 5 is adapted at its lower end, preferably, with outwardly projecting threaded section 9. The second member is bored in its upper section for the insertion of bolt 12A and is bored in its lower section for the insertion of bolt 13A.

Interconnecting the first riser member with the second fixed member are connectors 25, 25A, 26 and 26A which are rotatably held by bolts 12 and 12A and 13 and 13A which allow movement of the first and second members relative to each other. Roller chain connecting links, for example, are suitable interconnecting members.

The connecting links provide constrained vertical movement, with a small arc in the movement, between the first and second members.

Positioned between the riser member and the fixed member is screw 6. Screw 6 has an upper threaded section 10 which is threaded through threaded section 8 of the first riser member and a lower threaded section 11 threaded through threaded section 9 of the second member. Preferably, the upper threaded section of the screw will be of a first diameter, and the lower section of the screw will be of a second diameter, either greater or less than the first diameter. Additionally, the screw will carry two different pitches of thread, the upper section being either of a higher or a lower pitch for example, the upper section having 40 threads per inch, the lower section having about 24 threads per inch, the corresponding sections of the riser member and fixed member being threaded correspondingly. This arrangement yields an effective pitch of about 60 when employing a screw having an upper threaded diameter of 0.138 inch and about 40 threads per inch, (6 – 40 THD) and a lower threaded diameter of 0.190 inch and about 24 threads per inch (10 – 24 THD).

Other threading can be employed to yield finer adjustments. For example, an upper threaded section of 6 – 40 and a lower threaded section of 10 – 32 yield an effective pitch of 160 for an advancement of 0.0063 inch per turn.

In operation of the apparatus of this invention, the second fixed member is fixedly secured in a stationary position and the first riser member is afixed to the body to be positioned. The screw is thereupon adjusted upwardly or downwardly to provide movement between the two members and movement of the body afixed to the upper end of the riser member.

The apparatus of this invention can be made of any size and material. For the screw specified above, the upper threaded portion was about 0.825 inch and the lower threaded portion was 1 inch. The overall length of the screw was 5.125 inches, the lower threaded portion being positioned about 3.6 inches from the upper end of the screw. The screw was constructed of 316 stainless steel. Both risers were about 1 inch in width, 3.5 inches long, 0.375 inch thick and were constructed of stainless steel.

It will be evident from the foregoing that various modifications can be made to this invention. Such, however, are considered within the scope of the invention.

What is claimed is:

1. Apparatus comprising:
   (a) a first member having a threaded section:
   (b) a second member spaced from said first member and having a threaded section, said first member being movably connected to said second member for constrained vertical movement, with a small are in the movement; and ,
   (c) a screw member positioned between said first and said second member, said screw member having upper and lower threaded portions, said upper threaded portion engaging the threaded section of said first member and said lower threaded portion engaging the threaded section of said second member, the threads of said upper threaded portion having a pitch unlike the pitch of the threads of said lower threaded portion and the threads of said upper threaded portion and said lower threaded portion being of the same hand.

2. The apparatus of claim 1 in which said first member is adapted with a protruding threaded section.

3. The apparatus of claim 1 in which said second member is adapted with a protruding threaded section.

4. The apparatus of claim 1 in which said first member and said second member is adapted with a protruding threaded section.

5. The apparatus of claim 1 in which said upper threaded portion contains 40 threads per inch and said lower threaded portion contains 24 threads per inch.

6. The apparatus of claim 1 in which said upper threaded portion contains about 40 threads per inch and said lower threaded portion contains 32 threads per inch.

7. The apparatus of claim 2 in which said first member is afixed to a finshield.

8. The apparatus of claim 1 in which said first member is movable upwardly at about 0.0063 inch per revolution of said screw member.

9. The apparatus of claim 1 in which the upper threaded portion of said screw member has a smaller pitch than the lower threaded portion of said screw member.

10. The apparatus of claim 1 in which the lower threaded portion of said screw member has a larger pitch than the upper threaded portion of said screw member.

* * * * *